March 15, 1966  C. H. BOYD ETAL  3,240,333
APPARATUS FOR TESTING AND ASSORTING ARTICLES
Filed May 20, 1963  3 Sheets-Sheet 1
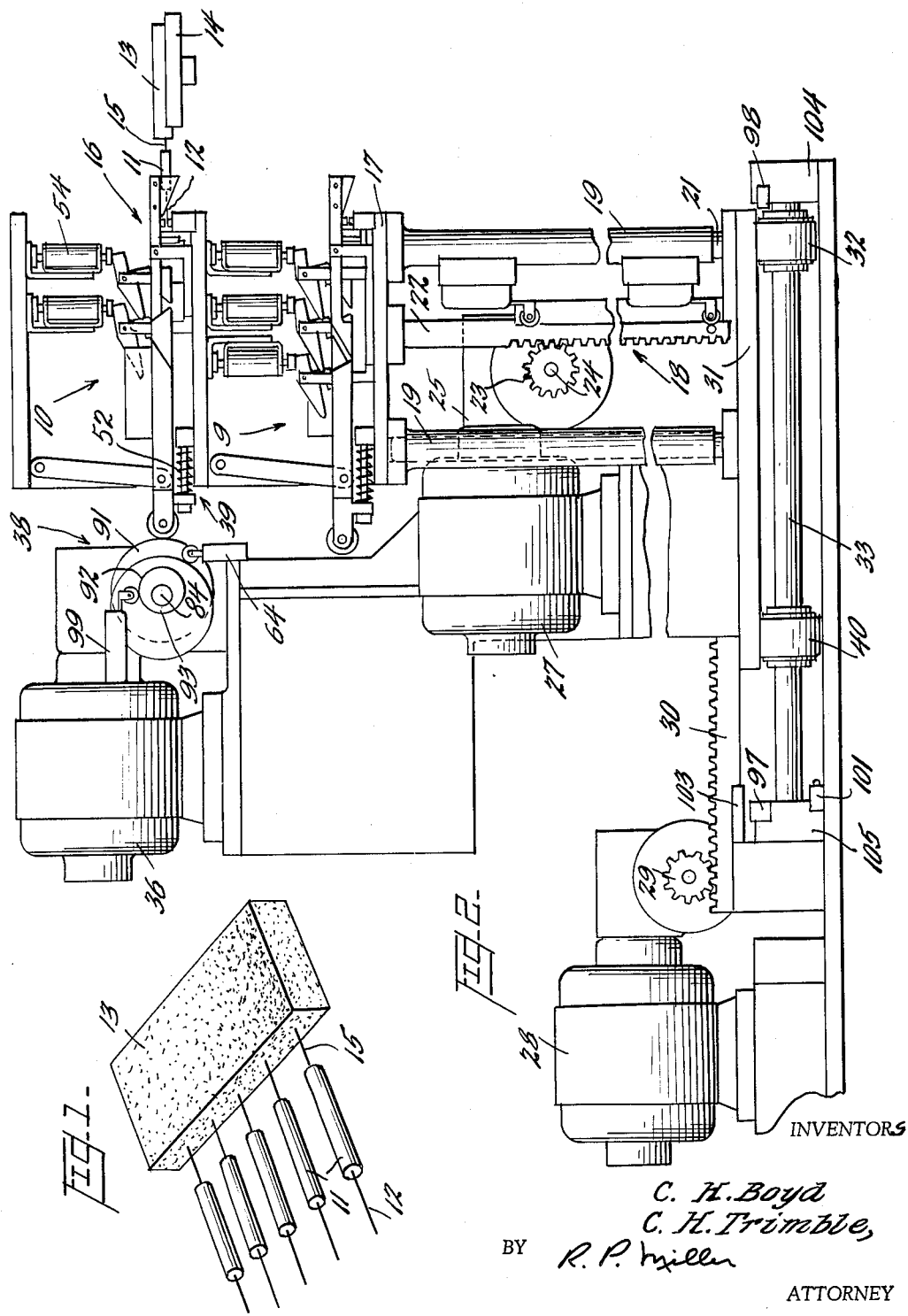
INVENTORS
C. H. Boyd
C. H. Trimble,
BY R. P. Miller
ATTORNEY March 15, 1966  C. H. BOYD ETAL  3,240,333
APPARATUS FOR TESTING AND ASSORTING ARTICLES
Filed May 20, 1963  3 Sheets-Sheet 2
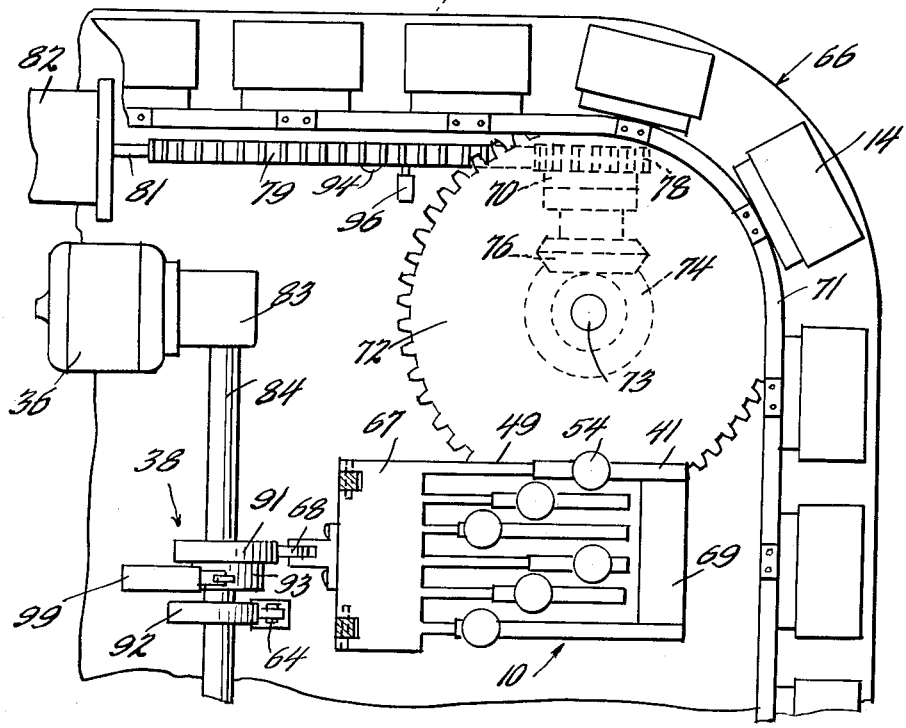
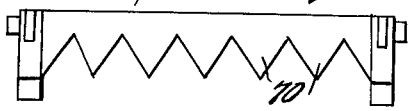
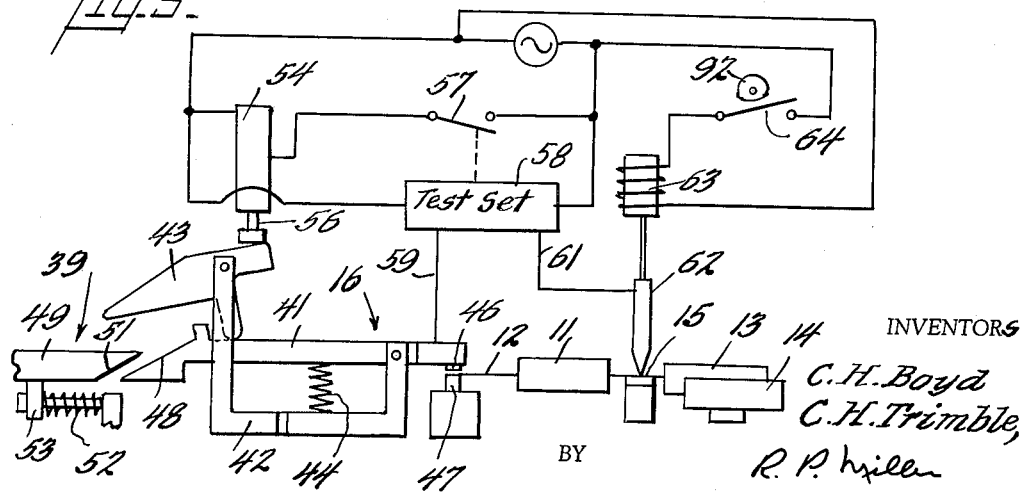
INVENTORS
C. H. Boyd
C. H. Trimble,
R. P. Miller
ATTORNEY March 15, 1966  C. H. BOYD ETAL  3,240,333
APPARATUS FOR TESTING AND ASSORTING ARTICLES
Filed May 20, 1963  3 Sheets-Sheet 3

INVENTORS
C. H. Boyd
C. H. Trimble,
BY R. P. Miller
ATTORNEY 3,240,333
United States Patent Office Patented Mar. 15, 1966

1

3,240,333
APPARATUS FOR TESTING AND ASSORTING
ARTICLES
Charles H. Boyd and Charles H. Trimble, Winston-Salem, N.C., assignors to Western Electric Company, Incorporated, New York, N.Y., a corporation of New York
Filed May 20, 1963, Ser. No. 282,532
13 Claims. (Cl. 209—81)

This invention relates to an apparatus for testing and assorting articles and more particularly to a device for removing electrical components from a carrier or package according to the results of electrical tests performed on the components.

In the manufacture of electrical components, it is often desirable to determine whether the components meet certain test standards. It is also desirable to perform these tests on the components during the course of manufacture to alleviate the need for material handling between the manufacturing process and the test process. The particular problem to be solved by this invention is that a testing components which are held in a carrier or package and removing or sorting the defective components while leaving the acceptable components in the package.

An object of this invention is to provide a new and improved apparatus for selectively testing and assorting articles positioned in a carrier or package.

Another object of this invention is to provide an apparatus for selectively removing articles from a carrier in response to characteristics determined by tests made on the articles.

Still another object of this invention is to provide an apparatus having jaws which grip articles in a carrier and cooperate with the test circuit to ascertain conditions of the articles while in a carrier and then selectively remove articles from the carrier in accordance with conditions ascertained by the test circuit.

A further object of this invention is to provide an apparatus having a plurality of test stations, each of which includes a plurality of jaws which are selectively held closed on the articles in accordance with tests during movement of the jaws away from the carrier.

A still further object of this invention is to provide a device for testing deposited carbon resistors packaged with terminals embedded in a penetrable foam plastic block and removing resistors having predetermined characteristics from the plastic block.

With these and other objects in view, the present invention contemplates a testing and sorting apparatus for selectively removing electrical components packaged or arranged in a carrier. More particularly, the apparatus includes a slide having a plurality of pivotally mounted jaws arranged to correspond to the array of components in the carrier. Facilities are provided to slide the jaws to a test position whereupon the jaws are pivoted to close upon the component. An electrical acceptability test is performed with a circuit being completed through the jaws and the gripped components. A series of solenoids corresponding to the arrangement of the paws are selectively operated to open or leave closed each respective jaw depending upon the results of the test. If a component is found to be acceptable, an electrical circuit is energized and operates that particular solenoid to open the jaw corresponding to that component. If a component is found to be unacceptable, the solenoid is not energized and the jaw corresponding to that component remains closed. Upon restoring the slide to its original position, the rejected components will be withdrawn from the carrier whereupon they will be successfully deposited in a discharge chute. This pattern could be reversed so that the acceptable components would be withdrawn from the carrier.

A complete understanding of this invention may be had by reference to the following detailed description when read in conjunction with the accompanying drawings illustrating an embodiment thereof, wherein:

FIG. 1 is a perspective view of electrical components removably mounted in a penetrable foam plastic block;

FIG. 2 is a side elevation view of an accept or reject apparatus embodying the invention and showing facilities for moving a test station and component gripping clamps into a test position and also an alternate test station which may be selectively moved into the testing position;

FIG. 3 shows a plan view of the apparatus in conjunction with a conveyor for positioning the components adjacent to the test station;

FIG. 4 shows a front view of a component lead positioning comb;

FIG. 5 is a detailed view of a single clamp and a mechanism for positioning the clamp in conjunction with a schematic diagram of a control and test circuit;

Figure 6:
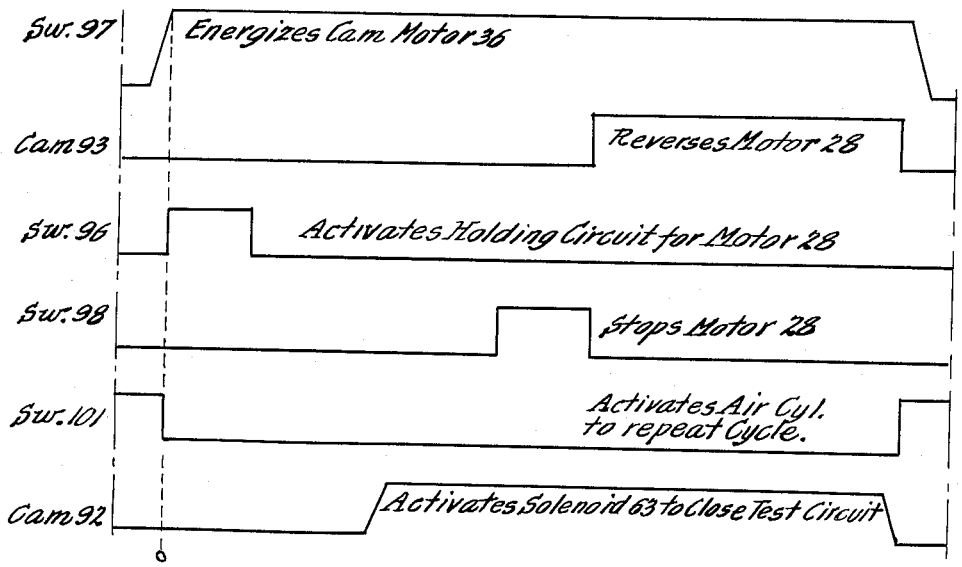
FIG. 6 is a timing diagram illustrating the relative operations of control cam and switch functions over a cycle of operation.

Referring to FIG. 1, a component 11 with leads 12 and 15 extending therefrom is shown with one lead 15 extending into a penetrable foam plastic block 13. The component may be a resistor, capacitor, or electrical device on which it is desired to perform one or more tests. The foam block is a cellular plastic that is readily penetrable by the inserting of the component lead 15.

FIG. 2 shows the plastic block 13 with resistors 11 extending therefrom positioned on a carrier 14. One lead 12 of the component 11 is shown positioned within a jaw assembly generally noted by the numeral 16. A plurality of jaw assemblies are mounted to comprise a test station 10 which in turn is mounted on a test station base 17. It will be noted that two test station bases 17 are shown one above the other and each is provided with a test station. When different sized components are to be tested, a lower test station 9 may be selectively raised into position to accommodate components of a different size. The raising mechanism is generally noted by the numeral 18 and consists of guide sleeves 19 slidably mounted on posts 21 and secured to the bottom of the lower test station base 17. A rack 22 is also shown connected to the bottom of the lower test station base 17. The rack is driven by a pinion gear 23 which is connected to a shaft 24 and driven through a suitable transmission 25 by a motor 27.

Another motor 28 is shown driving a second rack 30 and pinion 29 mechanism which moves a base member 31 on which is mounted the test station bases 17 and jaw assemblies 16. The base member 31 is secured to a pair of bearing collars 32 and 40 which are slidably mounted on a rod 33 supported at each end by upright members 104 and 105. As the rack 30 is moved, the base 31 slides on the rod 33 to position test station 9 or 10 mounted on the test station bases 17 in the test position and subsequently in the withdrawn position.

Referring now to FIG. 5, one set of jaws 46 and 47 of one jaw assembly 16 is shown gripping a component lead 12 projecting from the component 11. Jaw 46 has a trailing extremity or lever 41 and is pivotally mounted on a U-shaped frame 42. Also pivotally mounted on an upwardly projecting section of the frame 42 is a counterweighted actuator member 43 having an arm cooperating with a projection extending from the lever 41.

A spring 44 is mounted between the frame 42 and the lever 41 to maintain the upper jaw 46 closed against the lower jaw 47. Each lever 41 has a bevelled portion 48 formed on the rearward extremity. A follower assembly 39 is shown having a follower arm 49 with a bevelled surface 51 which cooperates with the bevelled portion 48 of the lever 41 to engage the rear portion of the lever and thereby pivot the lever 41 and the upper jaw 46 away from the lower jaw 47. The follower arm 49 is held against a cam 91 (shown in FIG. 2) by a spring 52 pushing against a lug 53 depending from the follower arm.

A solenoid 54 is positioned above the actuator member 43. This solenoid 54 has an armature 56 mounted to engage the actuator member 43. The solenoid 54 may be energized through a circuit including a switch 57 which is controlled, in turn, by a test set 58. One lead 59 of the test set is shown connected to upper jaw 46. A second lead 61 is connected to a knife-shaped bar probe 62 which contacts the partially-exposed lead 15 of the component 11 which is inserted in the plastic block 13. The knife-shaped probe 62 is attached to the armature of a solenoid 63 which is positioned in a circuit having a switch 64 controlled by a cam 92. Upon closure of the jaw 46 against the lead 12 and the movement of the probe 62 into engagement with the lead 15, a test circuit is completed through the test set 58 and the component 11.

Referring now to FIG. 3, it will be noted that a plurality of solenoids 54 are provided which are individually positioned above respective jaws 46. These solenoids are staggered so that the corresponding actuator members 43 and control levers 41 may be spaced close together to control the closely spaced jaws 46 which cooperate with the closely spaced components extending from the plastic block 13. It will also be noted that the length of the levers 41 varies to facilitate the staggering of the solenoids 64. The follower arms 49 are of corresponding varying lengths to compensate for variations in the length of the levers 41. The individual follower arms 49 are connected to a unitary crossbar 67. Attached to the crossbar 67 is a rotatable cam follower 68 that rides against cam 91.

Also shown in FIG. 3 is a comb 69 attached to the leading edge of the lever 41.

FIG. 4 shows a front view of the comb 69 wherein teeth 70 extend downwardly from the comb to provide grooves into which the component leads 12 are wedged to spread the component leads uniformly in order that they may mate properly with the test jaws 46 and 47.

There is shown in FIG. 3 a conveyor 66 for advancing a series of carriers 14 and blocks 13 into position to test the components 11. The conveyor 66 includes a chain 71 attached to the carriers 14. The chain is driven by a sprocket 72 mounted on a shaft 73 which is connected through pinion gears 74 and 76 to a unidirectional clutch 70. The clutch 70 in turn is driven by a pinion 78 which cooperates with a rack 79. A piston rod 81 is attached to the rack and is adapted to be reciprocated by an air cylinder 82. Upon activation of the air cylinder 82, the piston 81 and rack 79 move forward. This movement rotates the pinion 78, which in turn drives the unidirectional clutch 70 to rotate bevelled gear 76. The rotation of bevelled gear 76 is transferred by the mating bevelled gear 74 to the sprocket 72 which in turn drives the chain 71 to index the carriers 14 on the conveyor 66. Upon the return stroke of the air cylinder, the unidirectional clutch 70 prevents a backward movement of these elements.

The cam assembly 38 is driven by a motor 36 which drives a transmission 83 to rotate a shaft 84 on which the cam assembly 38 is mounted. The cam assembly is made up of three cams 91, 92, and 93. Cam 91 drives the follower arm 49 which controls the opening and closing of the jaws 46. Cam 92 is positioned to close the switch 64 which in turn controls the advance of the knife probe into engagement with the leads 15. Cam 93 (see also FIG. 7) is utilized to activate a switch 99 which in turn reverses the motor 28 through the energization of a relay 102.

Figure 7:
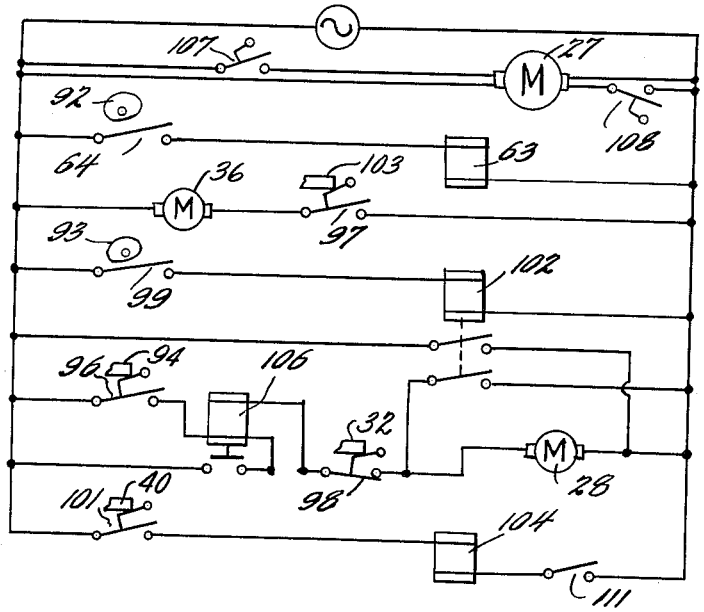
FIG. 7 is a schematic of an electrical control circuit which sequentially operates the device.

Referring to FIGS. 3 and 7, switch 96 is shown positioned adjacent to the rack 79. A cam surface 94 formed on the rack 79 acts to close the switch 96. This closure of switch 96 completes a circuit through a normally closed switch 98 to start and hold the motor 28. Motor 28 (FIG. 2) through rack 30 and pinion 29 mechanism moves the base member 31 toward the right. The advancing base member 31 strikes a switch 98 to open the energizing circuit of the motor 28 to thus stop the slide member 31 in the forward position.

Again referring to FIG. 2, the rack 30 and pinion 29 mechanism includes a cam surface 103 formed on the underside of rack 30 which closes a switch 97. Closure of switch 97 energizes the cam motor 36 to rotate the shaft 84 and the cam assembly 38.

Referring now to FIG. 3, a switch 99 placed adjacent to the cam 93 is closed by the movement of the cam to reverse the motor 28 which serves to retract the slide base member 31. Switch 101 (shown in FIG. 2) is mounted on a base upright 105 adjacent to the initial position of the slide mechanism. Full retraction of the slide 31 brings the bearing collar 40 into contact with the switch 101 which controls the operation of the air cylinder 82 to repeat a cycle of operation.

In the operation of the overall apparatus, assume that the racks 79 and 30 are in a left-hand position wherein the closing of switch 111 completes a circuit through a solenoid 104 and switch 101 to operate a valve (not shown) which admits air to the air cylinder 82 (FIG. 3). Upon activation of air cylinder 82, the rack 79 moves forward or toward the right to rotate the pinion 78 and subsequently the sprocket 72 through the clutch 22 and gears 74 and 76. Rotation of the sprocket 72 moves the chain 71 which, in turn, positions a carrier 14 carrying the components 11 in the test position so that the leads 12 are aligned with the respective sets of jaws 46 and 47.

The cam surface 94, upon completion of the forward stroke of the rack 79, closes the switch 96 which, in turn, completes a circuit through the normally closed switch 98 and motor 28 and at the same time energizes a relay 106 to complete a holding circuit through the motor 28.

Operation of the motor 28 drives a second rack 30 and pinion 29 mechanism (FIG. 2) to move the slide 31 and the test stations 9 and 10 toward the right. Upon forward movement of the rack 30, the cam surface 103 closes switch 97 to complete the energizing circuit for the cam motor 36 (FIG. 3). Operation of the cam motor 36 rotates the cam shaft 84 and the cams 91, 92, and 93. Cam 91 cooperates with cam follower 68 to open the jaw assemblies 16 for receiving component leads 12. Upon further rotation of cam 91, the jaw assemblies are allowed to close on the leads 12. Cam 92 closes a switch 64 to energize a solenoid 63 which, in turn, completes a circuit through the component to the test set 58 (FIG. 5).

During the foregoing operation of the jaw assemblies, the slide mechanism has moved forward so that the slide base 31 (FIG. 2) opens the normally closed switch 98 mounted on the upright 104. The opening of this switch 98 disrupts the holding circuit to the motor 28 and thereby stops the motors and forward movement of the slide 31. Cam 93 subsequently rotates to a position to close switch 99 which, in turn, completes the circuit through the relay 102 and thereby energizes the motor 28 in a reverse direction. This causes the slide member 31 to return to its initial position whereupon the sleeve 40 engages and closes the switch 101 to again control the operation of the air cylinder 82 and initiate a new cycle of operation. As soon as the slide base member 31 starts to move toward the initial position, the cam surface 103 moves to release the switch 97; thus interrupting the energizing circuit for the cam motor 36.

Reference is first made to FIGS. 2 and 3 for the operation of the apparatus at the test station 10 which sequentially grips the leads of the components, tests the components, and selectively removes components in accordance with the result of tests. Upon operation of the motor 28 and the subsequent initial forward movement of the rack 30, the switch 97 is operated to start the cam motor 36. The cam shaft 84 rotates to move a lobe on the cam 91 against the cam follower 68. While the motor 28 is operating to drive the entire test apparatus 10 forward on the rod 33, further rotation of the cam 91 causes the cam follower arm 49 and its bevelled edge 51 to contact the bevelled portions 48 of the levers 41. This pivots the levers 41 against the action of the springs 44 to open the jaws 46 away from the jaws 47 and thereby facilitate reception of the component lead 12 into the space between the jaws as the test station 10 moves into the test position. When the test station 10 has completed its forward movement and the bearing collar 32 has opened the switch 98 to stop the motor 28, further rotation of the cam 91 presents a low portion to the cam follower 68 whereupon the cam follower moves back toward the cam shaft under the urging of the cam follower spring 52. Retraction of the cam follower arms 49 to their original position disengages the bevelled edges 51 from the bevelled portions 48 of the levers 41 thus allowing springs 44 to close the jaws 46 against the jaws 47 with the component leads gripped therebetween. Further rotation of the cam shaft 84 positions a lobe on cam 92 in contact with the switch 64 to energize the solenoid 63 which moves the test probe 62 into contact with all of the leads 15. A lead 59 running from each jaw 46 to the test set, together with a lead 61 from the probe 62 to the test set, completes a circuit through the component to the test set to automatically and sequentially test a characteristic of each component such as resistance value, continuity, etc. If the characteristic determined by the test set meets a predetermined standard, a relay (not shown) closes one of the contacts 57 which energizes an associated solenoid 54. Energization of a solenoid 54 drives the armature 56 to contact and push down on a forward extremity of the corresponding counterweighted cam bar 43 thereby pivoting the cam bar. This movement, in turn, depresses the rear portion of the associated lever 41 against the action of the spring 44 to pivot the lever 41 and open the jaw 46 away from the jaw 47 to release the component lead held therebetween. Each component 11 is sequentially tested by a stepping circuit (not shown) in the test set and upon completion of the test of each component, the solenoid 54 corresponding to the tested component is either energized or not depending upon the test result to selectively grip or release the components.

Subsequently, further rotation of the shaft 84 causes a lobe on cam 93 to contact a switch 99 which closes to complete a circuit to reverse the motor 28 to slide the test station 10 rearwardly toward its initial position. If a component tested does not meet the predetermined standards programmed into the test set, the associated solenoid 54 in not energized to release the associated jaw 46 from the component lead. Therefore, if the component does not meet the standards of the test, subsequent withdrawal of the test station 10 permits the still closed jaws 46, 47 to withdraw the defective component from the carriers. As the test apparatus is being moved away from the component holding block 13, removing selected components from the blocks, a second lobe on the cam 91 again moves the cam follower arm 49 forward to pivot the levers 41 against the springs 44 thereby moving the closed jaws 46 away from the jaw 47. This opening of jaws 46 holding defective components, permits the components to drop into a suitable chute or container (not shown).

Since it may be desirable to test components having different physical and electrical characteristics, an alternate test station 9 is provided which may be raised into position by activation of switch 107 (FIG. 7). Closure of the switch 107 operates the motor 27 (FIG. 2) to drive the shaft 24 through a transmission 25 thus rotating the pinion 23 which, in turn, drives the rack 22 to raise the alternate test station 9 into the test position. A second switch 108 is connected in another circuit to drive the motor 27 in a reverse direction to lower the alternate test station 9 to the original position. Switches 107 and 108 act as both starter switches and limit switches, in that they are positioned to be opened by the limit of travel of the test stations in either direction.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for removing an article from a carrier in response to a characteristic determined by a test made on the article,
   a movably mounted jaw for gripping an article during testing,
   means rendered effective by the jaw gripping the article for testing characteristics of the article,
   means selectively responsive to a characteristic determined by the test for opening the jaw and responsive to an absence of the characteristic for maintaining the jaw closed, and
   means for moving the jaw away from the carrier to positively extract an article on which the jaw remained closed.

2. In a device for removing articles held on a carrier in accordance with an electrical characteristic determined by a test circuit,
   movably mounted clamp means for gripping articles to be tested,
   means rendered effective upon the clamp means gripping the articles for connecting the test circuit to the articles,
   means responsive to the test circuit ascertaining a predetermined condition for selectively opening the clamps from their gripping relation with the articles, and
   means for moving the clamps away from the carrier to remove the remaining gripped articles from the carrier.

3. In a testing apparatus for selectively withdrawing electrical components embedded in a penetrable block in a predetermined array,
   a plurality of pairs of jaws arranged in an array to correspond with the array of components,
   means for moving the jaws toward said components,
   means rendered effective upon movement of the jaws for opening said jaws to receive the components,
   means rendered effective upon completion of the advance of the jaws for closing jaws on said components,
   means connected to the jaws for electrically testing the components for a particular characteristic,
   means responsive to the electrical testing means ascertaining said particular characteristic in said components for opening the associated pair of jaws, and
   means operated upon the electrical testing means completing an electrical test for moving all the jaws away from said components whereupon the closed jaws withdraw the components having electrical characteristics other than said particular characteristic from the penetrable block.

4. In a device for testing the characteristics of components having extending leads and mounted on a carrier,
   a plurality of normally closed clamp means movably mounted for gripping and releasing component leads, a first control means for sequentially opening and closing said clamp means to grip leads extending from the component, means rendered effective upon closure of the clamp means for testing a characteristic of said components, a second control means responsive to the test means ascertaining a predetermined condition in certain components for selectively opening associated clamp means, and means for moving said clamp means away from said carrier to remove the clamped resistors from the carrier.

5. In a device for selectively withdrawing an article from a carrier, a movable normally closed clamp means, means for moving the clamp means to a position adjacent to the carrier, a cam means rendered effective during movement of said clamp means for sequentially opening and closing the clamp means to receive and grip the article, test means rendered effective by the clamp means gripping the article for determining certain characteristics of the article, means selectively responsive to the test means for opening the normally closed clamp means upon ascertaining a first condition and for maintaining the clamp means closed upon ascertaining a second condition, and means for moving the clamp means away from the carrier to remove a clamped article from the carrier.

6. In a device for clamping and selectively removing articles from a carrier in accordance with a test performed during clamping, a test station mounted for movement into and away from a position adjacent articles held in a carrier, clamps mounted on said test station for gripping the articles, means for normally closing said clamps, means for moving the test station to the position adjacent the articles held in the carrier, means for opening and closing the clamps to receive articles therebetween, test means rendered effective by the closure of the clamps on the article for determining characteristics of the articles, means responsive to a characteristic determined by the test means for selectively opening the associated normally closed clamps, and means for driving the test station away from the article carrier to remove any articles remaining clamped from the carrier.

7. In a device for selectively clamping and testing an article, a pivoted lever having a bevelled end and a jaw formed on the other end, a fixed jaw mounted adjacent to the pivoted lever jaw for clamping an article therebetween, a resilient means acting against the lever for normally pivoting the lever jaw against the fixed jaw, a follower means having a bevelled end mating with the bevelled end of the lever for pivoting said lever, means for sequentially moving the follower bevelled end toward and away from the bevelled end of the lever to open and close said lever jaw to receive an article therebetween, means rendered effective by the closing of said jaw on an article positioned on the lower jaw for testing characteristics of the article, and means responsive to characteristics determined by the test for selectively overriding the resilient means to open the jaws.

8. In a device for gripping an article to be selectively withdrawn from a carrier as a result of characteristics determined by tests performed on the article extending from the carrier, a movable test station, a jaw pivotally mounted on the test station, a fixed jaw mounted on the test station adjacent to said pivotal jaw, means for moving the test station into a position adjacent the article carrier, resilient means for moving the pivoted jaw against the fixed jaw to clamp an article extending from the carrier, means rendered effective by the clamping of said jaws for testing characteristics of the article, means responsive to the determination of a characteristic by the testing means for selectively overcoming the resilient means holding the pivoted jaw against the fixed jaw to release the clamped article, and means for moving the test station away from the carrier to withdraw from the carrier an article remaining clamped by the jaws in the absence of said determination of the characteristic.

9. In a device for selectively removing components from a carrier in response to results of tests made on the component, a pair of test stations mounted for vertical movement into the test position, means for selectively moving the test stations into the test position, a plurality of normally closed jaws mounted in each test station for movement into a position adjacent the component carrier, a first control means for sequentially opening the jaws to receive components to be tested and releasing the jaws to grip the components, means rendered effective upon closure of the jaws on the components for testing a characteristic of the component, a second control means responsive to the presence of the characteristic determined by the test means for selectively opening associated normally closed jaws, and means for moving the jaws away from the carrier to remove any components remaining gripped by the jaws from the carrier.

10. In a device for testing components held on a carrier and selectively removing the components from the carrier according to results of the test, a plurality of test stations mounted for selective movement into position for testing, means for selectively moving one of the plurality of test stations into position for testing to correspond to different characteristics of the component to be tested, movable jaws mounted on each of the test stations for gripping articles to be tested, resilient means for closing the jaws on the components to be tested, means rendered effective upon closure of the jaws for testing a characteristic of said components, means responsive to the means for testing a characteristic of said components for selectively overriding the action of the associated resilient means to open the closed jaws, and means for moving the jaws away from the test position to remove any components remaining gripped by the jaws from the carrier.

11. In a device for testing articles held by a carrier and removing those articles from the carrier not conforming to the test, a plurality of normally closed clamps mounted for movement into and away from a position adjacent the carrier, means for moving the clamps into position adjacent the carrier and for momentarily opening the clamps to receive the article, test means rendered effective by the closure of the clamps on the article for determining conformance of the article with a predetermined characteristic, means responsive to the test means determining conformance of the article with a predetermined characteristic for selectively opening the associated normally closed clamp to release the article, and means for moving the clamps away from the carrier to remove clamped articles not conforming to the test from the carrier.

12. In the device as set forth in claim 11 wherein each of the clamps comprise a fixed lower jaw, a first pivoted lever, an upper jaw formed on one end of the lever and positioned adjacent the lower jaw, a cammed surface formed on the other end of said lever for engaging the means for momentarily opening the clamps to receive the article, and a counterweighted second lever for transmitting motion from the means for selectively opening the clamp to the first lever to release the article and then return to its normal position by reason of the counterweight.

13. A device as set forth in claim 11 wherein the means for moving the clamps into position adjacent the carrier and for momentarily opening the clamps to receive the article comprises, a first motor and a gear means for moving the clamps into a position adjacent the carrier, a shaft, a cam mounted on the shaft, a follower mounted adjacent the cam for momentarily opening the clamps, a second motor for operating the shaft to rotate the cam, means rendered effective upon the movement of the clamps into position for activating the second motor to rotate the cam and advance the follower to momentarily open the clamps.

References Cited by the Examiner

UNITED STATES PATENTS 1,832,948    11/1931    Schmidt.
3,073,446    1/1963     Wilson et al. _____ 209—81

ROBERT B. REEVES, *Primary Examiner.*

BENJAMIN A. BORCHELT, *Examiner.*